US012668724B2

(12) United States Patent
Wang et al.

(10) Patent No.: US 12,668,724 B2
(45) Date of Patent: Jun. 30, 2026

(54) THERMAL-ACTIVATED, PEELABLE ADHESIVE TAPE

(71) Applicant: tesa SE, Norderstedt (DE)

(72) Inventors: Jianxin Wang, Suzhou (CN); Min Cao, Suzhou (CN); Shuang Wang, Hamburg (DE)

(73) Assignee: tesa SE, Norderstedt (DE)

( * ) Notice: Subject to any disclaimer, the term of this patent is extended or adjusted under 35 U.S.C. 154(b) by 222 days.

(21) Appl. No.: 18/350,107

(22) Filed: Jul. 11, 2023

(65) Prior Publication Data

US 2024/0010886 A1 Jan. 11, 2024

(30) Foreign Application Priority Data

Jul. 11, 2022 (CN) .......................... 202210813605.7

(51) Int. Cl.
B32B 41/00 (2006.01)
C09J 7/24 (2018.01)
(Continued)

(52) U.S. Cl.
CPC ............. C09J 133/08 (2013.01); C09J 7/243 (2018.01); C09J 7/245 (2018.01); C09J 7/255 (2018.01);
(Continued)

(58) Field of Classification Search
CPC . C09J 133/08; C09J 7/243; C09J 7/245; C09J 7/255; C09J 7/26; C09J 2301/124;
(Continued)

(56) References Cited

U.S. PATENT DOCUMENTS

| | | | |
|---|---|---|---|
| 2008/0115889 A1* | 5/2008 | Hall .......................... | C09J 7/385 |
| | | | 156/332 |
| 2018/0010018 A1 | 1/2018 | Ma et al. | |
| 2023/0033447 A1 | 2/2023 | Yamashita et al. | |

FOREIGN PATENT DOCUMENTS

| | | | |
|---|---|---|---|
| CN | 114106729 A | 3/2022 | |
| EP | 3050927 A1 * | 8/2016 | ............. B32B 27/08 |

(Continued)

OTHER PUBLICATIONS

European Patent Office, Extended European Search Report for European Patent Application No. 23182998.7, dated Oct. 19, 2023, 9 pages.

*Primary Examiner* — Michael N Orlando
*Assistant Examiner* — Joshel Rivera
(74) *Attorney, Agent, or Firm* — PRICE HENEVELD LLP

(57) ABSTRACT

An adhesive tape that includes: a first adhesive layer defining an upper surface of the tape; a second adhesive layer defining a lower surface of the tape; and a reinforcement layer (or first and second reinforcement layers) and a thermally activated layer between the first adhesive layer and the second adhesive layer. The thermally activated layer is a thermoplastic polymer layer. The thermoplastic layer may be made of ethylene-vinyl acetate copolymer, modified polyolefin, ethylene acrylic acid copolymer, ethylene terpolymer, polyamide copolymer, poly(trans-1,4-isoprene), polyethylene oxide, or a combination thereof. Further, the thermoplastic layer may exhibit a melting point from 60° C. to 150° C. and may have a molecular weight from 1,000 to 1,000,000.

20 Claims, 3 Drawing Sheets

100

| 11 |
|---|
| 12 |
| 13 |
| 14 |

(51) Int. Cl.
| | |
|---|---|
| *C09J 7/25* | (2018.01) |
| *C09J 7/26* | (2018.01) |
| *C09J 133/08* | (2006.01) |

(52) U.S. Cl.
CPC ........... *C09J 7/26* (2018.01); *C09J 2301/124*
(2020.08); *C09J 2301/312* (2020.08)

(58) Field of Classification Search
CPC ........... C09J 2301/312; C09J 2301/162; C09J
2400/243; C09J 2475/006; C09J 7/29;
C09J 2301/304; C09J 2423/006; C09J
2423/046; C09J 2433/00; C09J 2467/006;
C09J 7/35; C09J 7/22; C09J 7/38; C09J
2301/12; C09J 2301/502
USPC .................... 156/60, 64, 350, 351, 378, 379
See application file for complete search history.

(56) References Cited

FOREIGN PATENT DOCUMENTS

| | | | | | |
|---|---|---|---|---|---|
| EP | 3757157 | A1 | * | 12/2020 | ................ C08J 9/32 |
| JP | 2016079361 | A | | 5/2016 | |
| KR | 1020220091492 | A | | 6/2022 | |
| WO | 2017059073 | A1 | | 4/2017 | |
| WO | 2021084945 | A1 | | 5/2021 | |

* cited by examiner

THERMAL-ACTIVATED, PEELABLE ADHESIVE TAPE

FIELD OF THE DISCLOSURE

The disclosure relates to the field of adhesive tape, in particular to a thermal-activated internal peelable adhesive tape, preparation and application thereof.

BACKGROUND OF THE DISCLOSURE

Tape has a wide range of applications in many fields, and high adhesion is the most basic requirement for it. However, customer requirements have diversified in the field of adhesive tape. Although conventional high-performance adhesive tape provides high adhesion, when the bonded object needs to be separated under specific conditions, its high adhesion makes it difficult to disassemble, repair and re-bond.

Therefore, there is a need in the art for an adhesive tape that has both excellent adhesive properties when adhesion is required, and can also be easily peeled off when separation is required.

BRIEF SUMMARY OF THE DISCLOSURE

The object of the present disclosure is to provide an adhesive tape having both an excellent adhesive property and a peeling property, and preparation and application thereof.

The disclosure relates to a heat-activated internal peeling tape and its preparation and application. Specifically, the present disclosure discloses an adhesive tape with a low melting point and a thermoplastic polymer layer as a thermal activation layer. The adhesive tape has excellent adhesion performance under normal use at room temperature and has an easy removal function when heated to a certain temperature. It can meet the requirements of the product in the entire life cycle, including providing reliable adhesion, and controllable removal to help realize product component recycling, and has a wide application prospect.

According to a first aspect of the present disclosure, an adhesive tape is provided that includes: a first adhesive layer defining an upper surface of the tape; a second adhesive layer defining a lower surface of the tape; and a reinforcement layer and a thermally activated layer between the first adhesive layer and the second adhesive layer. Further, the thermally activated layer is a thermoplastic polymer layer.

According to a second aspect of the present disclosure, the first aspect is provided, wherein the first adhesive layer has a thickness of 5 μm to 100 μm, and wherein the second adhesive layer has a thickness of 5 μm to 100 μm.

According to a third aspect of the present disclosure, the first aspect is provided, wherein the reinforcement layer has a thickness of 2 μm to 250 μm.

According to a fourth aspect of the present disclosure, the first aspect is provided, wherein the thermally activated layer has a thickness of 2 μm to 50 μm.

According to a fifth aspect of the present disclosure, the first aspect is provided, wherein the reinforcement layer comprises a material selected from the group consisting of PET, PBT, PE, PP, PU, nylon, PU foam, and PE foam.

According to a sixth aspect of the present disclosure, the first aspect is provided, wherein the thermoplastic polymer layer comprises a material selected from the group consisting of ethylene-vinyl acetate copolymer, modified polyolefin, ethylene acrylic acid copolymer, ethylene terpolymer, polyamide copolymer, poly(trans-1,4-isoprene), polyethylene oxide, and a combination thereof.

According to a seventh aspect of the present disclosure, the sixth aspect is provided, wherein the thermoplastic polymer layer exhibits a melting point from 60° C. to 150° C. and has a molecular weight from 1,000 to 1,000,000.

According to an eighth aspect of the present disclosure, the first aspect is provided, wherein the adhesive tape consists of, in order from the upper surface of the tape to the lower surface of the tape: the first adhesive layer comprising an acrylate; the reinforcement layer comprising a PET; the thermally activated layer comprising an ethylene-vinyl acetate copolymer; and the second adhesive layer comprising an acrylate.

According to a ninth aspect of the present disclosure, the first aspect is provided, wherein the adhesive tape has a thickness of 50 μm to 500 μm.

According to a tenth aspect of the present disclosure, an adhesive assembly is provided, comprising a first component, a second component, and the adhesive tape of the first aspect, wherein the first component and the second component are bonded by the adhesive tape.

According to an eleventh aspect of the present disclosure, an adhesive tape is provided that includes: a first adhesive layer defining an upper surface of the tape; a second adhesive layer defining a lower surface of the tape; and a first reinforcement layer, a second reinforcement layer, and a thermally activated layer between the first adhesive layer and the second adhesive layer. Further, the thermally activated layer is a thermoplastic polymer layer.

According to a twelfth aspect of the present disclosure, the eleventh aspect is provided, wherein the first adhesive layer has a thickness of 5 μm to 100 μm, and wherein the second adhesive layer has a thickness of 5 μm to 100 μm.

According to a thirteenth aspect of the present disclosure, the eleventh aspect is provided, wherein the first and second reinforcement layers have a thickness of 2 μm to 250 μm.

According to a fourteenth aspect of present disclosure, the eleventh aspect is provided, wherein the thermally activated layer has a thickness of 2 μm to 50 μm.

According to a fifteenth aspect of the present disclosure, the eleventh aspect is provided, wherein each of the first and the second reinforcement layer comprises a material selected from the group consisting of PET, PBT, PE, PP, PU, nylon, PU foam, and PE foam.

According to a sixteenth aspect of the present disclosure, the eleventh aspect is provided, wherein the thermoplastic polymer layer comprises a material selected from the group consisting of ethylene-vinyl acetate copolymer, modified polyolefin, ethylene acrylic acid copolymer, ethylene terpolymer, polyamide copolymer, poly(trans-1,4-isoprene), polyethylene oxide, and a combination thereof.

According to a seventeenth aspect of the present disclosure, the sixteenth aspect is provided, wherein the thermoplastic polymer layer exhibits a melting point from 60° C. to 150° C. and has a molecular weight from 1,000 to 1,000,000.

According to an eighteenth aspect of the present disclosure, the eleventh aspect is provided, wherein the adhesive tape consists of, in order from the upper surface of the tape to the lower surface of the tape: the first adhesive layer comprising an acrylate; the first reinforcement layer comprising a PU foam; the thermally activated layer comprising a modified polyolefin; the second reinforcement layer comprising a PU foam; and the second adhesive layer comprising an acrylate.

According to a nineteenth aspect of the present disclosure, the eleventh aspect is provided, wherein the adhesive tape has a thickness of 50 μm to 500 μm.

According to a twentieth aspect of the present disclosure, an adhesive assembly is provided, comprising a first component, a second component, and the adhesive tape of the eleventh aspect, wherein the first component and the second component are bonded by the adhesive tape.

It should be understood that in the present disclosure, any of the technical features specifically described above and below (such as in the Examples) can be combined with each other, so as to constitute new or preferred technical solutions which will not redundantly be described one by one herein.

DETAILED DESCRIPTION OF THE DISCLOSURE

Figure 1:
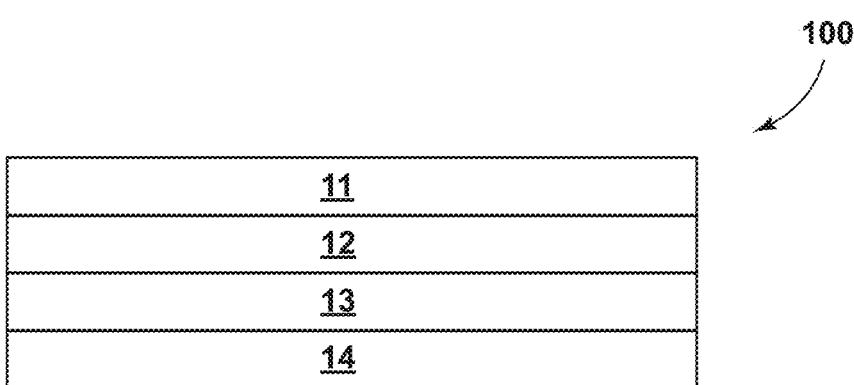
FIG. 1 is a schematic, cross-sectional diagram of an adhesive tape, according to one or more embodiments of the present disclosure.

After a long and intensive study, the present inventors have unexpectedly prepared an adhesive tape having both excellent adhesive properties and excellent peeling properties by optimizing the composition and/or structure. When the adhesive tape is used for bonding, the components to be bonded can be bonded quickly with high strength; when the bonded components need to be separated, after heat treatment by heating and/or laser treatment, the peeling force of the adhesive tape will be rapidly reduced, so that the bonded components can be easily and conveniently separated. The tape has excellent comprehensive performance, can fully meet customer needs and market demand, and has a wide range of application prospects. On this basis, the inventors have completed the present disclosure.

As used herein, the English abbreviations used in the present disclosure have the following meanings:

EVA: ethylene vinyl acetate
PET: polyethylene terephthalate
PBT: polybutylene terephthalate
PE: polyethylene
PP: polypropylene
PU: polyurethane
nylon: polyamide
SS304: grade 304 stainless steel Thermally Activated Internal Peelable Adhesive Tape and its Application The disclosure provides an adhesive tape comprising:

a first adhesive layer defining an upper surface of the tape;

a second adhesive layer defining a lower surface of the tape; and a reinforcement layer and a thermally activated layer between the first adhesive layer and the second adhesive layer.

Further, the thermally activated layer is a thermoplastic polymer layer.

In another preferred embodiment, the components of the first adhesive layer and the second adhesive layer are independently selected from the group consisting of acrylate, natural rubber, thermoplastic styrene block copolymer, silicone, EVA adhesive, and a combination thereof.

In another preferred embodiment, the first adhesive layer has a thickness of 5-100 μm, preferably 25-75 μm, or more preferably 45-55 μm.

In another preferred embodiment, the second adhesive layer has a thickness of 5-100 μm, preferably 25-75 μm, or more preferably 45-55 μm.

In another preferred embodiment, the reinforcement layer has a thickness of 2-250 μm, preferably 10-150 μm, or more preferably 12-100 μm.

In another preferred embodiment, the thermally activated layer has a thickness of 2-50 μm, preferably 5-30 μm, or more preferably 10-20 μm.

In another preferred embodiment, the thermally activated layer is a low melting point polymer layer. In another preferred embodiment, the melting point of the low melting point polymer is 60-150° C., preferably 70-120° C., or more preferably 70-90° C. In another preferred embodiment, the molecular weight of the low melting point polymer is 1,000-1,000,000, preferably 1,000-500,000, or more preferably 2,000-500,000. In another preferred embodiment, the low melting point polymer is a thermoplastic polymer.

In another preferred embodiment, the thickness of the adhesive tape is 50-500 μm, preferably 80-400 μm, more preferably 100-350 μm.

In another preferred embodiment, in the adhesive tape, the thermally activated layer and the reinforcement layer are set adjacent to each other.

It should be understood that, after the heat treatment, the thermally activated layer of the adhesive tape of the present disclosure will be separated from the reinforcement layer so as to realize a separation of the bonded components. That is, the separation of the bonded components amounts to a peeling of the adhesive tape. More specifically, after being heated, the thermally activated layer will absorb heat and melt, so that the cohesion of the thermally activated layer is reduced, and the adhesion with the adhesive layer and/or the reinforcement layer is reduced, and finally the separation of the bonded component is achieved.

In another preferred embodiment, the thermal activation temperature of the thermally activated layer is 70-120° C., preferably 80-110° C., more preferably 85-105° C., or most preferably 90-100° C.

In another preferred embodiment, the heat treatment is performed by one or more manner as selected from the group consisting of heat treatment, laser treatment, and a combination thereof.

In another preferred embodiment, room temperature refers to 0-40° C., preferably 10-30° C., or more preferably 15-25° C.

Referring now to FIG. 1, an adhesive tape 100 is depicted in exemplary form according to an embodiment of the disclosure. Adhesive tape 100 as shown in FIG. 1 includes: a first adhesive layer 11 (e.g., as made of acrylate and having a thickness of 50 μm); a reinforcement layer 12 (e.g., as made of PET and having a thickness of 12 μm); a thermally activated layer 13 (e.g., as made of ethylene-vinyl acetate copolymer and having a thickness of 10 μm); and a second adhesive layer 14 (e.g., as made of acrylate and having a thickness of 50 μm).

Figure 2:
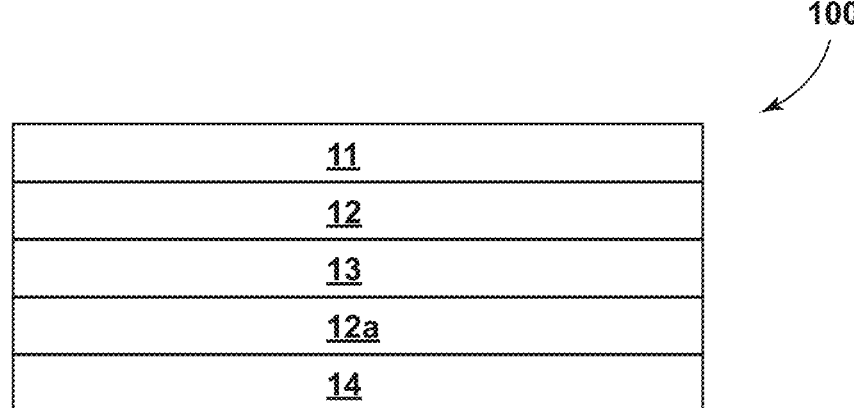
FIG. 2 is a schematic, cross-sectional diagram of an adhesive tape, according to one or more embodiments of the present disclosure.

Referring now to FIG. 2, an adhesive tape 100 is depicted in exemplary form according to an embodiment of the disclosure. Adhesive tape 100 as shown in FIG. 2 includes: a first adhesive layer 11 (e.g., as made of acrylate and having a thickness of 50 μm); a reinforcement layer 12 (e.g., as made of PU foam and having a thickness of 100 μm); a thermally activated layer 13 (e.g., as made of modified polyolefin and having a thickness of 20 μm); a reinforcement layer 12a (e.g., as made of PU foam and having a thickness of 100 μm); and a second adhesive layer 14 (e.g., as made of acrylate and having a thickness of 50 μm).

In some implementations of the adhesive tape 100 (see FIGS. 1-2), the thermally activated layer 13 can made of a thermoplastic polymer, e.g., ethylene-vinyl acetate copolymer, a modified polyolefin, an ethylene acrylic acid copolymer, an ethylene terpolymer, a polyamide copolymer, a poly(trans-1,4-isoprene), a polyethylene oxide, or a combination thereof. In an embodiment, the thermally activated layer 13 is a low melting point polymer layer. According to one implementation, the thermally-activated layer 13 is one of an ethylene-vinyl acetate copolymer and a modified polyolefin.

In some embodiments of the adhesive tape 100 (see FIGS. 1-2), the melting point of the thermally activated layer 13 is 60-150° C., preferably 70-120° C., or more preferably 70-90° C. According to one implementation, the melting point of the thermally activated layer 13 is from 75° C. to 105° C. In another embodiment, the molecular weight of the thermally activated layer 13 is 1,000-1,000,000, preferably 1,000-500,000, or more preferably 2,000-500,000. In one implementation, the thermally activated layer 13 has a molecular weight of 1000 to 5000.

In some embodiments of the adhesive tape 100 (see FIGS. 1-2), the thermally activated layer 13 can have a thickness of 2-50 μm, preferably 5-30 μm, or more preferably 10-20 μm. For example, the thermally activated layer 13 can have a thickness of 2 μm, 3 μm, 4 μm, 5 μm, 6 μm, 7 μm, 8 μm, 9 μm, 10 μm, 15 μm, 20 μm, 25 μm, 30 μm, 35 μm, 40 μm, 45 μm, 50 μm, and all thickness values between the foregoing thicknesses.

It should be understood that the adhesive tape of the present disclosure (e.g., the adhesive tape 100 depicted in exemplary form in FIGS. 1 and 2) can be prepared using conventional preparation methods understood by those skilled in the field of this disclosure. For example, the adhesive tape 100 can be laminated by rubber roller, direct pressing and/or hot pressing techniques, as understood by those skilled in the field of the disclosure. In some embodiments, one or more primary surfaces of the elements of the adhesive tape 100 (e.g., reinforcement layer(s) 12, 12a) are subjected to a corona and/or plasma surface treatment to improve bonding.

The adhesive tape of this disclosure (e.g., the adhesive tapes 100 depicted in exemplary form in FIGS. 1 and 2) is suitable for being used as a tape capable of easy disassembly, e.g., a reworkable double-sided pressure-sensitive tape that can be used in the production of various products, especially electronic products. Representative electronic products include (but are not limited to): computers, televisions, laptops, tablets, mobile phones, digital cameras, etc., which need bonding between various electronic components and can benefit from subsequent disassembly, recycling and rework of their electronic components.

Compared with the prior art, the adhesive tape of the present disclosure (e.g., the adhesive tape 100 depicted in exemplary form in FIGS. 1 and 2) has the following main advantages:

(1) after heat treatment, the adhesive force of the tape will be significantly reduced, so that the tape has excellent peeling performance;

(2) under normal use at room temperature, the adhesive tape has excellent adhesion performance;

(3) after the heat treatment, when the temperature of the tape is restored to room temperature, the adhesive force of the tape will be restored as before; and (4) the characteristics of a simple preparation process, low cost and wide application range.

The present disclosure will be further illustrated below with reference to the specific examples. It should be understood that these examples are only to illustrate the disclosure but not to limit the scope of the disclosure. The experimental methods with no specific conditions described in the following examples are performed under conventional conditions. Unless indicated otherwise, percentage and parts are calculated by weight.

Unless otherwise defined, all professional and scientific terminology used in the text have the same meanings as known to those skilled in the field of this disclosure. In addition, any methods and materials similar or equal with the recorded content can apply to the methods of the disclosure. The method of the preferred embodiment described herein and the material are only for demonstration purposes.

Example 1: Adhesive Tape Ex. 1

The structure of the adhesive tape of this example (denoted "Ex. 1") is configured as shown in FIG. 1, including the following features from the upper surface to the lower surface of the tape: a first adhesive layer 11 made of acrylate and having a thickness of 50 μm; a reinforcement layer 12 made of PET and having a thickness of 12 μm; a thermally activated layer 13 made of ethylene-vinyl acetate copolymer (e.g., CAS No. 24937-78-8) and having a thickness of 10 μm; and a second adhesive layer 14 made of acrylate and having a thickness of 50 μm.

Further, in this example, the thermally-activated layer is made of ethylene-vinyl acetate copolymer, has a melting point from 75° C. to 105° C., and a molecular weight of about 2000. In addition, the adhesive tape of this example was prepared using a rubber roller, direct pressing lamination approach.

Example 2: Adhesive Tape Ex. 2

The structure of the adhesive tape of this example (denoted "Ex. 2") is configured as shown in FIG. 2, including the following features from the upper surface to the lower surface of the tape: a first adhesive layer 11 made of acrylate and having a thickness of 50 μm; a reinforcement layer 12 made of PU foam and having a thickness of 100 μm; a thermally activated layer 13 made of modified polyolefin and having a thickness of 20 μm; a reinforcement layer 12a made of PU foam and having a thickness of 100 μm; and a second adhesive layer 14 made of acrylate and having a thickness of 50 μm.

Further, in this example, the thermally-activated layer is made of a modified polyolefin in which olefin is its primary component (as modified by at least one functional group), has a melting point from 75° C. to 100° C., and a molecular weight from 1000 to 5000. In addition, the adhesive tape of this example was prepared using a rubber roller, direct pressing lamination approach.

Performance Test and Analysis

As used herein, the terms "peel force" and "peeling force" are used interchangeably and are obtained from testing according to the Chinese Peel Force Test Method for Peel Strength of Pressure-Sensitive Tape at 180°, GB/T 2792-2014 ("Peel Force Test"). In the Peel Force Test, a SS304 test plate is employed with a mirrored finish.

Figure 3:
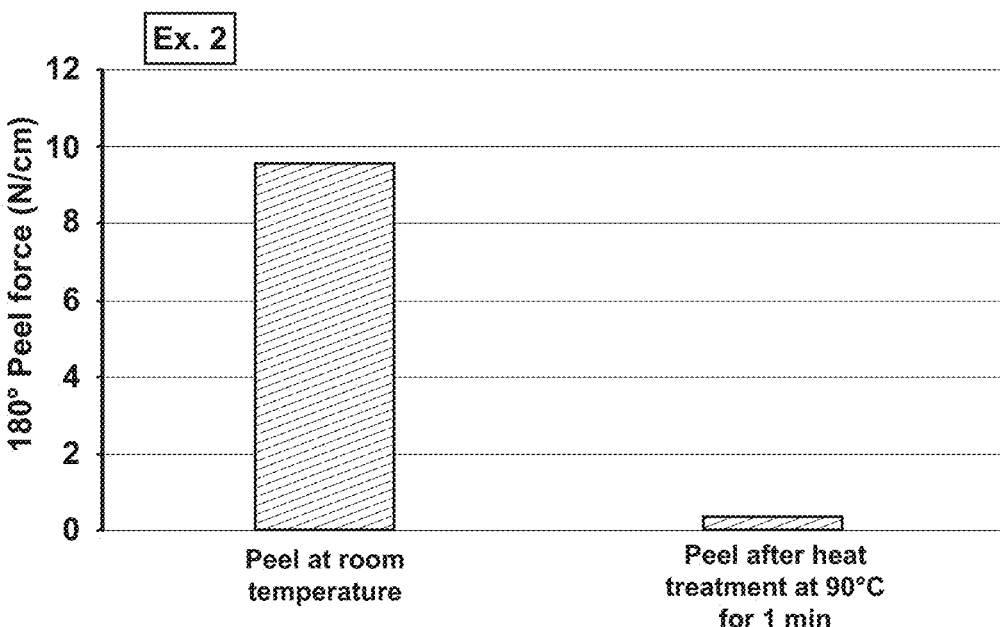
FIG. 3 is a bar graph showing the relationship of peel force and temperature of an adhesive tape configured according to FIG. 2, according to one or more embodiments of the present disclosure.

Referring to FIG. 3, a bar graph is provided that shows the relationship of peel force and temperature of the Ex. 2 adhesive tape, as configured according to FIG. 2 of the present disclosure and tested according to the Peel Force Test. It can be seen from FIG. 3 that, after heat treatment at 90° C. for 1 minute, the peeling force of the Ex. 2 adhesive tape is significantly reduced, and the peeling failure mode changes from the separation of the adhesive layer and the SS304 test plate under normal temperature peeling to the separation of the reinforcement layer and the thermally activated layer, so that the adhesive tape basically has no adhesive force. That is, the Ex. 2 adhesive tape as bonded to the SS304 test plate can be separated with very small peeling force.

Figure 4:
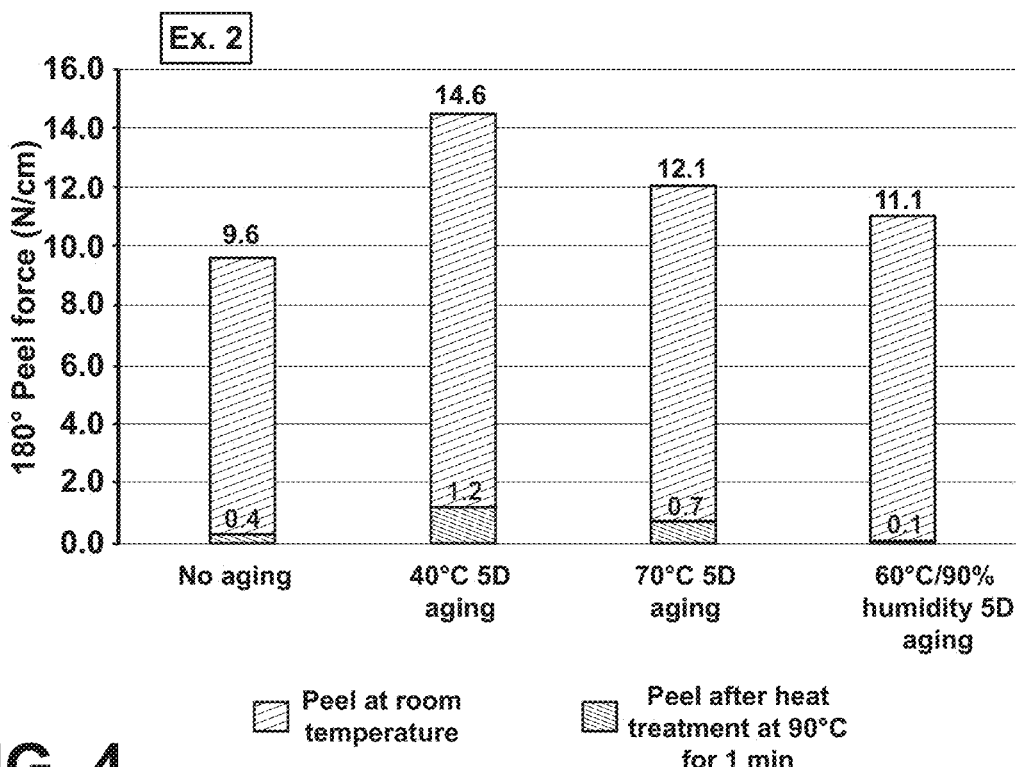
FIG. 4 is a bar graph of the peel force of an adhesive tape configured according to FIG. 2 under different aging conditions, according to one or embodiments of the present disclosure.

Referring now to FIG. 4, a bar graph is provided that shows the peeling force of the Ex. 2 adhesive tape of the present disclosure under different aging conditions, as tested with the Peel Force Test. It can be seen from FIG. 4 that, after aging for 5 days at room temperature, 40° C., 70° C., and 60° C. with 90% humidity, the 180° Peel Force Test was carried out on a SS304 test plate at room temperature and at 90° C., respectively. It is obvious that the short-term aging under different conditions of this example will not reduce the peel force of the Ex. 2 adhesive tape, and the peel failure mode continues to be the same mode of separation of the adhesive layer and the SS304 test plate. Further, after undergoing different aging conditions, the Ex. 2 adhesive tape can still achieve separation of the reinforcement layer and the thermally activated layer with very small force at high temperature.

Figure 5:
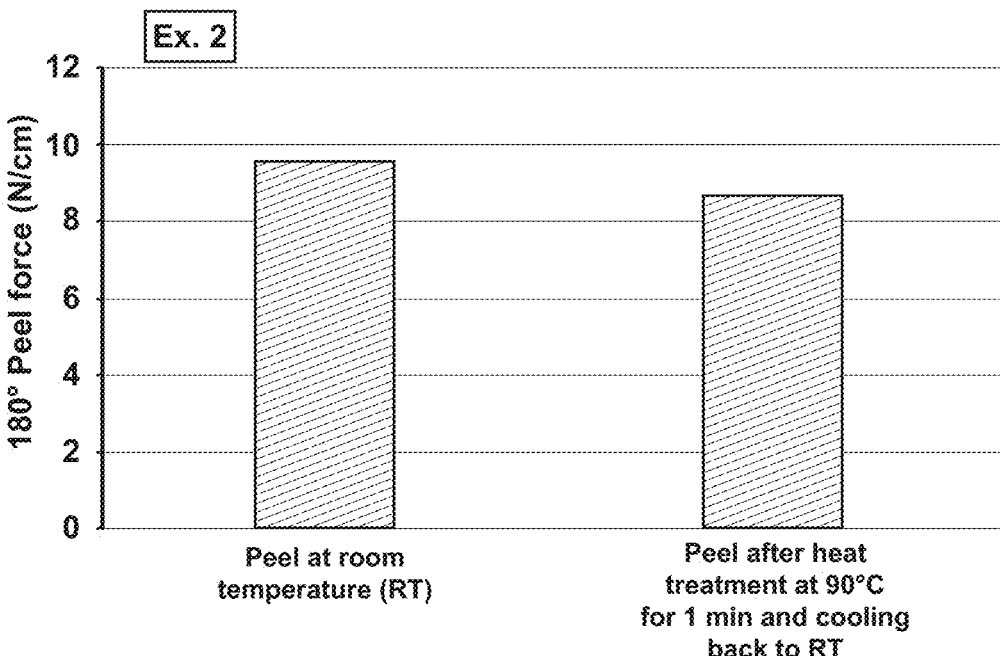
FIG. 5 is a bar graph of the peel force of an adhesive tape configured according to FIG. 2 when cooled to room temperature after heat treatment at 90° C. for 1 minute, according to one or more embodiments of the present disclosure.

Referring now to FIG. 5, a bar graph is provided that shows the peel force of the Ex. 2 adhesive tape of the present disclosure when cooled to room temperature after heat treatment at 90° C. for 1 minute, as tested with the Peel Force Test. As can be seen from FIG. 5, the Ex. 2 adhesive tape is cooled to room temperature after a heat treatment of 90° C. for 1 minute, and its peel force is still at the same level as the original sample peel force at room temperature. Further, the failure mode remains unchanged because the melting and solidification of the thermally activated layer is a reversible physical change.

Comparative Example 1: Adhesive Tape Comp. Ex. 1

The structure of the comparative adhesive tape of this example (denoted "Comp. Ex. 1") is substantially as shown in FIG. 1, including the following features from the upper surface to the lower surface of the tape: a first adhesive layer 11 made of acrylate and having a thickness of 50 μm; a reinforcement layer 12 made of PET and having a thickness of 12 μm; a layer 13 made of metal and having a thickness of 6 μm; and a second adhesive layer 14 made of acrylate and having a thickness of 50 μm. In this comparative example, Comp. Ex. 1, the layer 13 is made of metal (e.g., SS304); however, layer 13 of Comp. Ex. 1 is not a thermally activated layer as described above and employed in the adhesive tapes of the disclosure, including the Ex. 1 and Ex. 2 adhesive tapes.

Figure 6:
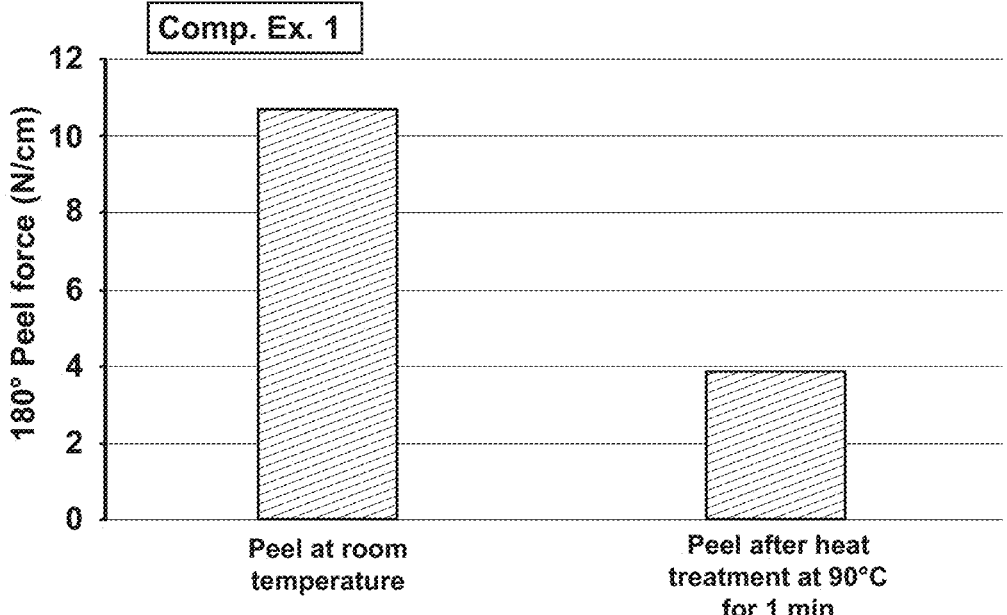
FIG. 6 is a bar graph showing the relationship of peel force and temperature of a comparative adhesive tape.

Referring now to FIG. 6, a graph is provided that shows the relationship of peel force and temperature of the comparative adhesive tape, Comp. Ex. 1, as tested with the Peel Force Test. It can be seen from FIG. 6 that, after a heat treatment at 90° C. for 1 minute, the peeling force of the Comp. Ex. 1 adhesive tape does not significantly decrease, and basically retains 40% of the original adhesive force at room temperature. Compared with the test results of the Ex. 2 adhesive tape after a heat treatment at 90° C. for 1 minute, the test results of this example show that it is more difficult to peel the Comp. Ex. 1 adhesive tape from the SS304 test plate.

For the adhesive tape of the present disclosure, which uses a high molecular polymer as the thermally activated layer, a common heating tool such as an oven or a heating plate can be used for heating, so that the transition of the thermally activated layer of the high molecular polymer from a solid state to a liquid state can be achieved, along with excellent peeling of the adhesive tape. However, in the case of the Comp. Ex. 1 adhesive tape, excellent peeling of the adhesive tape cannot be achieved well at a simple high temperature heat treatment of 90° C. due to the use of a metal layer in place of the thermally activated layer of the adhesive tapes of the disclosure, including Ex. 1 and Ex. 2.

All literature and test methods mentioned earlier in the present disclosure are incorporated by reference in this disclosure. Additionally, it should be understood that after reading the above teachings, many variations and modifications may be made by those skilled in the art of this disclosure, and these equivalents also fall within the scope as defined by the appended claims.

We claim:

1. An adhesive tape comprising, in order from an upper surface of the tape to a lower surface of the tape:
   a first adhesive layer defining an upper surface of the tape;
   a reinforcement layer directly contacting the first adhesive layer;
   a thermally activated layer directly contacting the reinforcement layer; and
   a second adhesive layer directly contacting the thermally activated layer, the second adhesive layer defining a lower surface of the tape, wherein the thermally activated layer is a thermoplastic polymer layer,
   wherein the thermally activated layer is configured such that, upon heating to a thermal activation temperature, the thermoplastic polymer layer melts to reduce cohesion of the thermally activated layer and reduce adhesion between the thermally activated layer and the reinforcement layer, thereby enabling separation of the adhesive tape at an interface between the thermally activated layer and the reinforcement layer.

2. The adhesive tape of claim 1, wherein the first adhesive layer has a thickness of 5 μm to 100 μm, and wherein the second adhesive layer has a thickness of 5 μm to 100 μm.

3. The adhesive tape of claim 1, wherein the reinforcement layer has a thickness of 2 μm to 250 μm, and the thermally activated layer has a thickness of 2 μm to 50 μm.

4. The adhesive tape of claim 1, wherein the thermoplastic polymer layer has a molecular weight from 1,000 to 5,000, and wherein the thermoplastic polymer layer has a thermal activation temperature of 70° C. to 120° C.

5. The adhesive tape of claim 1, wherein the reinforcement layer comprises a material selected from the group consisting of PET, PBT, PE, PP, PU, nylon, PU foam, and PE foam.

6. The adhesive tape of claim 1, wherein the thermoplastic polymer layer comprises a material selected from the group consisting of ethylene-vinyl acetate copolymer, modified polyolefin, ethylene acrylic acid copolymer, ethylene terpolymer, polyamide copolymer, poly(trans-1,4-isoprene), polyethylene oxide, and a combination thereof.

7. The adhesive tape of claim 6, wherein the thermoplastic polymer layer exhibits a melting point from 60° C. to 150° C. and has a molecular weight from 1,000 to 1,000,000, and wherein the thermally activated layer is configured such that melting and solidification of the thermally activated layer are reversible physical changes, such that adhesive force of the tape is restored when the tape is cooled to room temperature after heat treatment.

8. The adhesive tape of claim 1, wherein:

the first adhesive layer comprises an acrylate;

the reinforcement layer comprises a PET;

the thermally activated layer comprises an ethylene-vinyl acetate copolymer; and the second adhesive layer comprises an acrylate.

9. The adhesive tape of claim 1, wherein the adhesive tape has a thickness of 50 μm to 500 μm.

10. An adhesive assembly, comprising a first component, a second component, and the adhesive tape of claim 1, wherein the first component and the second component are bonded by the adhesive tape.

11. An adhesive tape comprising, in order from an upper surface of the tape to a lower surface of the tape:

a first adhesive layer defining an upper surface of the tape;

a first reinforcement layer directly contacting the first adhesive layer;

a thermally activated layer directly contacting the first reinforcement layer;

a second reinforcement layer directly contacting the thermally activated layer; and a second adhesive layer directly contacting the second reinforcement layer, the second adhesive layer defining a lower surface of the tape;

wherein the thermally activated layer is a thermoplastic polymer layer, wherein the thermally activated layer is configured such that, upon heating to a thermal activation temperature, the thermoplastic polymer layer melts to reduce cohesion of the thermally activated layer and reduce adhesion between the thermally activated layer and the first reinforcement layer or the second reinforcement layer, thereby enabling separation of the adhesive tape at an interface between the thermally activated layer and the first reinforcement layer or the second reinforcement layer.

12. The adhesive tape of claim 11, wherein the first adhesive layer has a thickness of 5 μm to 100 μm, and wherein the second adhesive layer has a thickness of 5 μm to 100 μm.

13. The adhesive tape of claim 11, wherein the first and second reinforcement layers have a thickness of 2 μm to 250 μm.

14. The adhesive tape of claim 11, wherein the thermally activated layer has a thickness of 2 μm to 50 μm.

15. The adhesive tape of claim 11, wherein each of the first and the second reinforcement layers comprises a material selected from the group consisting of PET, PBT, PE, PP, PU, nylon, PU foam, and PE foam.

16. The adhesive tape of claim 11, wherein the thermoplastic polymer layer comprises a material selected from the group consisting of ethylene-vinyl acetate copolymer, modified polyolefin, ethylene acrylic acid copolymer, ethylene terpolymer, polyamide copolymer, poly(trans-1,4-isoprene), polyethylene oxide, and a combination thereof.

17. The adhesive tape of claim 16, wherein the thermoplastic polymer layer exhibits a melting point from 60° C. to 150° C. and has a molecular weight from 1,000 to 1,000,000, and wherein the thermoplastic polymer layer has a thermal activation temperature of 70° C. to 120° C.

18. The adhesive tape of claim 11, wherein the adhesive tape consists of, in order from the upper surface of the tape to the lower surface of the tape:

the first adhesive layer comprising an acrylate;

the first reinforcement layer comprising a PU foam;

the thermally activated layer comprising a modified polyolefin;

the second reinforcement layer comprising a PU foam; and the second adhesive layer comprising an acrylate.

19. The adhesive tape of claim 11, wherein the adhesive tape has a thickness of 50 μm to 500 μm.

20. An adhesive assembly, comprising a first component, a second component, and the adhesive tape of claim 11, wherein the first component and the second component are bonded by the adhesive tape.

* * * * *